May 6, 1952     G. H. J. BAULE     2,595,628
TRANSMISSION MECHANISM
Filed Feb. 17, 1945     2 SHEETS—SHEET 1
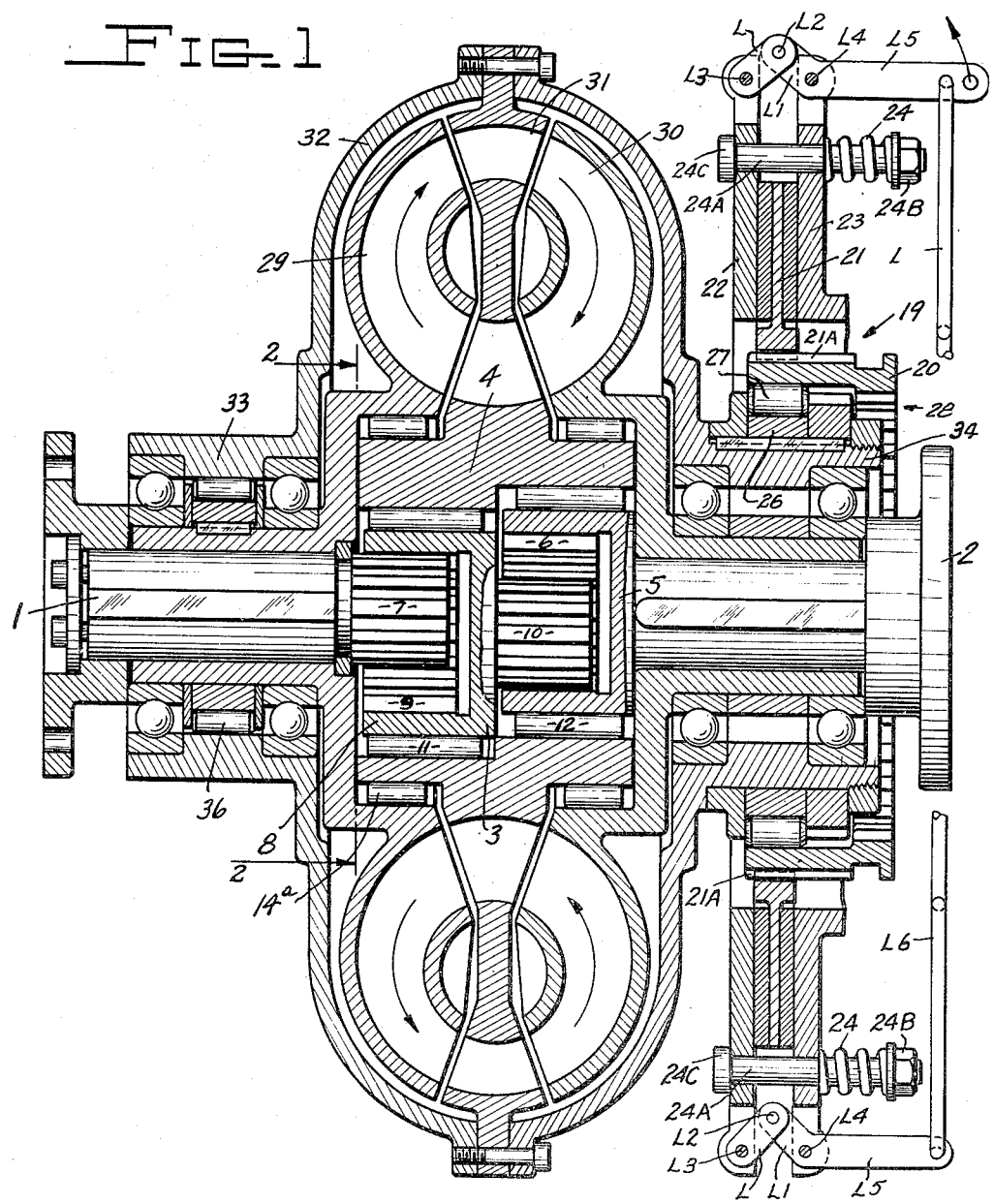
INVENTOR:
Gerhard H. J. Baule May 6, 1952  G. H. J. BAULE  2,595,628
TRANSMISSION MECHANISM
Filed Feb. 17, 1945  2 SHEETS—SHEET 2
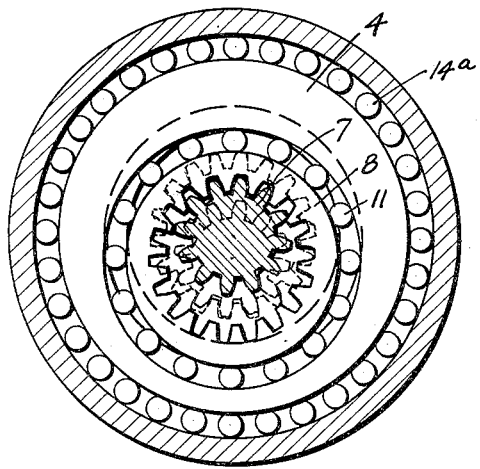
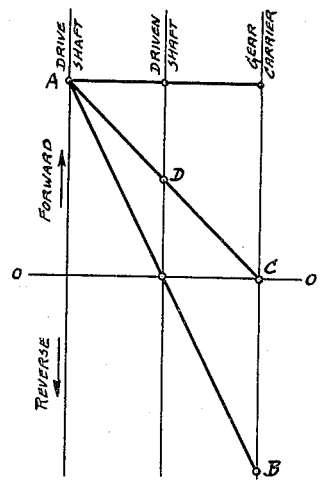
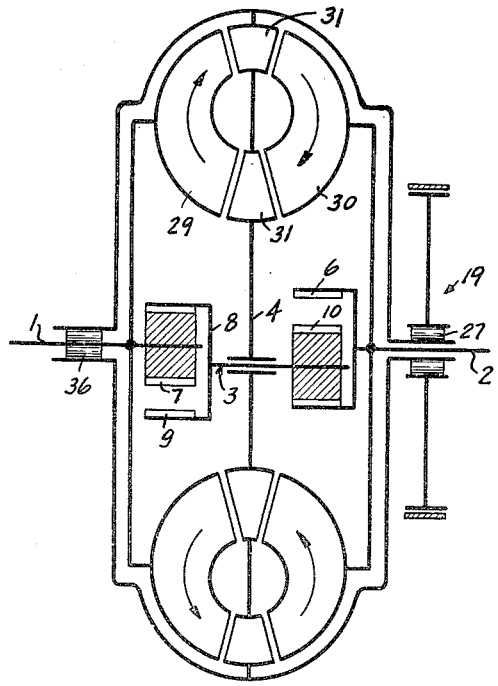
INVENTOR:
Gerhard H. J. Baule Patented May 6, 1952

2,595,628

UNITED STATES PATENT OFFICE 2,595,628

TRANSMISSION MECHANISM

Gerhard H. J. Baule, Salina, N. Y.

Application February 17, 1945, Serial No. 578,503

5 Claims. (Cl. 74—638)

This invention relates to transmission mechanisms and has for its object a transmission mechanism embodying a positive low or starting gear between drive and driven shafts and higher ratio motion transmitting means involving a slip-clutch action, through which the speeds above low starting speeds are transmitted from the drive to the driven shafts, the transfer from the low speed to the higher speed and from the higher speed to the lower being automatic. The motion transmitting means with the slip-clutch action embodies a hydraulic transmission as a hydraulic torque converter. The predominant feature is a transmission embodying a hydraulic means or torque converter or equivalent structure having a slipping action, in which the starting force is through a positive low ratio gearing, in contradistinction to building up from start through a slip coupling.

The invention consists in the novel features and in the combinations and constructions hereinafter set forth and claimed.

In describing this invention, reference is had to the accompanying drawings, in which like characters designate corresponding parts in all the views.

Figure 1 is a longitudinal sectional view of a coupling embodying this invention.

Figure 2 is a sectional view on the plane of line 2—2, Figure 1.

Figure 3 is a diagrammatic view of the coupling shown in Figure 1.

Figure 4 is a chart illustrating the relative speeds of the various parts and the transfer of power of this transmission mechanism.

This transmission mechanism includes driving and driven shafts, a positive low planetary gear train between the shafts including a planetary gear carrier rotatable about the axis of the shafts and eccentric gearing in the carrier, hydraulic motion transmitting means actuatable by the drive shaft and connected to the driven shaft and including an impeller and at least one driven member actuated by the hydraulic fluid from the impeller and connected to the gear carrier to rotate therewith, and means operable to hold the carrier from rotation in a retrograde direction under the reaction of the gearing and permitting rotation thereof in a forward direction. More specifically, this mechanism comprises generally, driving and driven shafts arranged in axial alinement, a gear element extending between the shafts, a carrier therefor mounted to rotate about the axis of the shafts, the gear element being mounted in the carrier to rotate about an axis eccentric and parallel to the axis of the shafts, one of the shafts being formed with an internal gear, and the other of the shafts having a pinion mounted thereon, the gear element having an internal gear meshing with said pinion and also having a pinion meshing with the internal gear of said one of the shafts, motion transmitting means between the drive shaft and the carrier and involving mechanism as a hydraulic torque converter having a slipping action, and means normally preventing the carrier from retrograde movement under the reaction of the internal gears and pinions. In the drawings, the hydraulic mechanism is a torque converter having two driven members, one a reactor connected to the gear carrier to rotate therewith, and the other a runner. The carrier is locked from retrograde rotation but free to rotate forwardly so that the drive is through the planetary gearing at starting and extremely low speed.

1 and 2 designate respectively the driving and driven shafts, these being arranged in axial alinement. 3 designates the gear element mounted between the opposing ends of the shafts. 4 is a carrier mounted to rotate about the axis of the shafts. One of the shafts 1 or 2, here shown as the driven shaft 2, is provided with a head 5 formed with internal gear teeth 6 and the other shaft 1 having a pinion 7. 8 designates a head on the gear element 3 formed with internal gear teeth 9 meshing with the pinion 7. 10 designates the pinion of the gear element meshing with the internal gear 6 on the driven shaft 2. The carrier 4 surrounds the gear element 3 and suitable journal bearings 11, 12 are provided between the carrier and the peripheries of the heads 8 and 5 in which the internal gears are formed.

The slip coupling includes a pump or impeller 29 keyed to the drive shaft 1, a turbine or runner 30 keyed to the driven shaft 2, and an intermediary re-actor or stator 31, which is fixed to the housing 32, but which becomes a runner or part of the runner, when rotating in a forward direction or not functioning as a stator. The stator thus becomes a driven member, the runner being another driven member. Hence in Figure 1, the stator 31 becomes a driven member rotatable with the gear carrier 4. The overrunning clutch 27 permits forward rotation only of the driven member 31, Figure 1. The housing is provided with hubs 33 and 34 having bearings concentric with the drive and driven shafts. The re-actor 31 may be mounted on the gear carrier 4 to rotate therewith. An overrunning clutch 36 may be provided between the drive shaft 1 and hub 33 of housing 32.

With idling driving force applied to the shaft 1, the motion will be transferred through the pinion 7, internal gear 8, pinion 10, internal gear 6 to the driven shaft 2. To start the vehicle, means is provided for holding the carrier 4, and hence the stator 31, from retrograde movement. This means is here shown as a one-way or overrunning brake device 19, this brake device includes a hub 20 which is the outer race of an overrunning clutch, and a friction plate or disk 21 rotatable with the hub and here shown as splined thereon, and extended between friction plates 22, 23, which are pressed toward each other onto the friction plate 21 by springs 24. The plates 22, 23 are suitably secured to the frame or housing, not shown. As here illustrated, the friction disk 21 is slidably splined at 21A on the hub 20, the springs 24 are compression ones coiled about studs 24A extending through the margins of the plates 22, 23, the springs 24 being interposed between the plate 23 and a nut 24B at one end thereof. The plates 22, 23, or at least the plate 23 is slidably mounted on the studs. The studs are anchored to the plate 22 by heads 24C thrusting against the outer side of the plate 22. Normally, the plates 22, 23, are pressed against the disk 21 and hold the brake device engaged. For illustrative purposes, the means for disengaging the brake device embodies a plurality of normally folded toggles including links L, L1, pivoted together at L2 at like ends and at their other ends at L3, L4, to the lugs at the peripheral edges of the plates 22, 23. Each link L1 has an outward extending lever arm L5. The arms L5 are connected together by a link L6 so that the toggles are operated in unison and one of the lever arms is connected to a driver-operated part as a pedal or other operator-operated means. When operated, the toggles move toward a straight line and separate the plate 22 from the disk 21, and let the disk 21 separate from the disk 23 by shifting along the splines 21A so that the brake disengages. The brake device 19 may be held disengaged by the manual means or the pedal, or by the toggles being arranged to shift into a straight or dead center line.

As before stated, the hub 20 is the outer raceway of a one-way clutch 27. 26 designates the inner cam raceway, which is keyed to the hub 34 of the housing 32. 27 designates the rollers. As overrunning clutches are well known, it is thought that description thereof is unnecessary.

In the normal operation, the brake device 19 is engaged. However, when stopping the vehicle, the brake device 19 is disengaged by any suitable means such as described. When the brake is engaged, obviously the stator 31 can not rotate rearwardly, and hence the driving force will be transferred through the gear element and boosted by the converter and the internal gears 8 and 6 to the driven shaft 2. As the speed of the engine and vehicle increases and the converter increases its power, the converter will gradually pick up the load and drive the shaft 2 faster than through the gear element alone, the overrunning clutch 27 embodied in the brake device 19 permitting the forward running of the stator. Also, as the speed drops to extremely low, the gear element automatically takes up the drive, so that starting is always made through a positive gearing and a positive gearing always takes hold automatically when the speed drops to an extreme low.

Means is provided for locking out the overrunning clutch 27 in order to use the engine as a brake, when desired, as when coasting down grade. This means consists of a jaw or toothed clutch 28 consisting of a collar keyed to the hub 34 of the housing and having peripheral jaw teeth coacting with internal clutch teeth of the collar 20, when the collar 20 is moved into interlocking engagement. When the lock-out clutch 28 is engaged, it is clear that the engine will act directly as a brake through the gear element. On going down-hill, the locking out of the overrunning clutch 27 and normal engagement of brake device 19 will cause the driven shaft to rotate the drive shaft and engine through the gearing at a higher speed, the same as going down hill in low gear in present transmissions. The hydraulic coupling impeller will then pump the liquid against a stator held stationary and will contribute to the braking. If the brake device 19 is disengaged going down hill with the overrunning clutch 27 cut out, the runner will become the impeller and the impeller becomes the runner.

In operation, when the brake device 19 is "off," or disengaged, the reactor and gear carrier are free to rotate backwards under the reaction of the gears 7, 9, 10 and 6. When the brake device 19 is engaged and the housing 32 and hence the re-actor and gear carrier 4, are held stationary, part of the drive torque is transmitted through the reduction gearing with an increase of torque for the driven shaft, while at the same time whatever drive torque is transmitted through or converted by the hydraulic converter is directly added to the driven shaft.

When the load torque decreases sufficiently (by the vehicle against momentum) to be taken care of by the hydraulic converter alone and the driven shaft rotates at a speed above that transmitted by the reduction gearing, the gear carrier will rotate in the same direction as drive and driven shafts at a speed somewhere between that of those two shafts and will take the hydraulic re-actor along, thus gradually building up to a one-to-one ratio.

The overrunning clutch 36 prevents the gear carrier from rotating faster than the drive shaft, thus cutting out any free wheeling action where the driven shaft may move faster than the drive shaft, and thus permit keeping the same under control in traffic by just controlling the speed of the motor.

Referring to Figure 4, points on the three vertical lines marked "Drive Shaft," "Driven Shaft," "Gear Carrier" indicate the speeds of these elements forward or reverse, depending on their position above or below the zero line respectively. Thus, if the drive shaft makes "A" revolutions and the gear carrier is held stationary, as indicated by point C on the zero line, the driven shaft will have a speed of "D" revolutions as the result of the gear reduction. This condition is indicated by the straight line A—D—C. Thus, at the start, when the car and therewith the driven shaft is stationary, the line A—B drawn from point A through the zero point on the driven shaft vertical will cut the gear carrier line at B, and B indicates that the gear carrier is moving in the reverse direction at a speed shown by the distance of point B from the zero line. Also, when the drive shaft and driven shaft rotate at the same speed, the gear carrier moves at the same speed and in the same direction as shown by the line starting at "A" and parallel to the zero line. Therefore, when brake device 19 is disengaged, the speeds of the parts are indicated by line A—B, the driven shaft being stationary and the gear carrier moving in reverse direction. When brake device 19 is now engaged, it will gradually bring the gear carrier to a stand-still and the driven shaft speed will gradually and in proportion increase from zero to a speed indicated by point "D." This is the maximum speed obtainable through the gearing alone. Thereafter, any increase in speed is obtained by the hydraulic converter acting directly on the driven shaft, in which case as a result the gear carrier speed forward is increased in proportion, taking along the hydraulic re-actor.

Owing to the relative arrangement of the gear element and the gear carrier surrounding it and also of the fluid drive radially outward from the carrier, the coupling is particularly compact in a radial direction, and also owing to the arrangement of the eccentric or planetary gears and the internal gears, slightly eccentric only to the axis of rotation, not only is the structure compact but also can be run at high speed without excessive outward strains tending to cause the coupling to fly apart under the centrifugal force. In other words, the structure can rotate at the high R. P. M. of modern engines without flying apart.

What I claim is:

1. In a transmission mechanism, driving and driven shafts, a positive low planetary gear train directly connecting said shafts including a gear carrier rotatable about the axis of the shafts and eccentrically mounted gearing in the carrier, motion transmitting means actuatable by the driving shaft and connected to the driven shaft, and including hydraulic motion transmitting members including an impeller and runner, the impeller being directly rotatable with the driving shaft and positively actuated thereby the runner being mounted on and keyed to the driven shaft, and means operable to hold the carrier from rotation in a retrograde direction under the reaction of the train of gears and permitting rotation in a forward direction.

2. In a transmission mechanism, driving and driven shafts arranged in axial alinement, a gear element extending between the shafts, a carrier for said element mounted to rotate about the axis of the shafts, one of the shafts being provided with an internal gear and the other of the shafts having a pinion mounted thereon, the gear element being mounted to rotate in the carrier about an axis eccentric and parallel to the axis of the shafts and having an internal gear meshing with said pinion and also having a pinion meshing with the internal gear of said one of the shafts, means operable to hold the carrier from rotation under the re-action of the gear element, said means being releasable to permit said rotation, and motion transmitting means actuatable by the drive shaft and connected to the driven shaft to drive the same including a motion transmitting means having a slip-clutch action.

3. In a transmission mechanism, driving and driven shafts arranged in axial alinement, a gear element extending between the shafts, a carrier for said element mounted to rotate about the axis of the shafts, one of the shafts being provided with an internal gear and the other of the shafts having a pinion mounted thereon, the gear element being mounted to rotate in the carrier about an axis eccentric and parallel to the axis of the shafts and having an internal gear meshing with said pinion and also having a pinion meshing with the internal gear of said one of the shafts, means operable to hold the carrier from rotation under the re-action of the gear element, said means being releasable to permit said rotation, and hydraulic motion transmitting means actuatable by the drive shaft and operatively connected to the driven shaft and including a hydraulic motion transmitter having a rotatable driven element keyed to the driven shaft to rotate with the driven shaft.

4. In a transmission mechanism, driving and driven shafts arranged in axial alinement, a gear element extending between the shafts, a carrier for said element mounted to rotate about the axis of the shafts, one of the shafts being provided with an internal gear and the other of the shafts having a pinion mounted thereon, the gear element being mounted to rotate in the carrier about an axis eccentric and parallel to the axis of the shafts and having an internal gear meshing with said pinion and also having a pinion meshing with the internal gear of said one of the shafts, means operable to hold the carrier from rotation under the re-action of the gear element, said means being releasable to permit said rotation, motion transmitting means actuatable by the drive shaft and connected to the driven shaft including a hydraulic torque converter having an impeller connected to the drive shaft, a runner rotatable with the driven shaft and a re-actor connected to the carrier to rotate with the same, a housing for the impeller, the runner and the re-actor, the re-actor being secured to the housing to rotate therewith, and means operable to hold the carrier from rotation under the re-action of the gear element, operating through the housing and the re-actor.

5. In a transmission mechanism, driving and driven shafts arranged in axial alinement, a gear element extending between the shafts, a carrier for said element mounted to rotate about the axis of the shafts, one of the shafts being provided with an internal gear and the other of the shafts having a pinion mounted thereon, the gear element being mounted to rotate in the carrier about an axis eccentric and parallel to the axis of the shafts and having an internal gear meshing with said pinion and also having a pinion meshing with the internal gear of said one of the shafts, means operable to hold the carrier from rotation under the re-action of the gear element, said means being releasable to permit said rotation, motion transmitting means actuatable by the drive shaft and connected to the driven shaft including a hydraulic torque converter having an impeller connected to the drive shaft, a runner rotatable with the driven shaft and a re-actor connected to the carrier to rotate with the same.

GERHARD H. J. BAULE.

REFERENCES CITED

The following references are of record in the file of this patent:

UNITED STATES PATENTS

| Number | Name | Date |
|---|---|---|
| 804,438 | Simonds | Nov. 14, 1905 |
| 1,473,487 | McCarthy | Nov. 6, 1923 |
| 2,251,170 | Seybold | July 29, 1941 |
| 2,284,123 | Breer | May 26, 1942 |
| 2,285,760 | Thompson | June 9, 1942 |
| 2,314,253 | Stewart | Mar. 16, 1943 |
| 2,318,660 | Barrett | May 11, 1943 |
| 2,349,642 | Watson | May 22, 1944 |

FOREIGN PATENTS

| Number | Country | Date |
|---|---|---|
| 780,597 | France | Apr. 29, 1935 |